B. B. FARNHAM.
BALL BEARING FLANGED TROLLEY WHEEL.
APPLICATION FILED JAN. 4, 1913.
1,063,522.
Patented June 3, 1913.
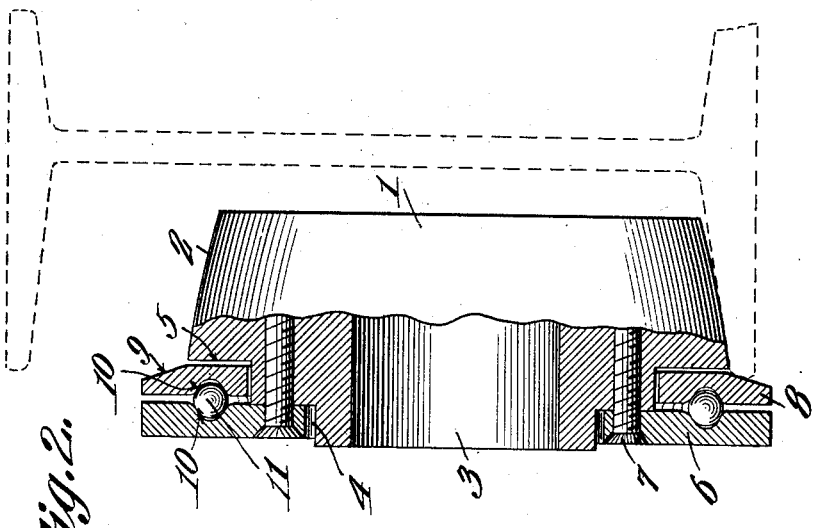
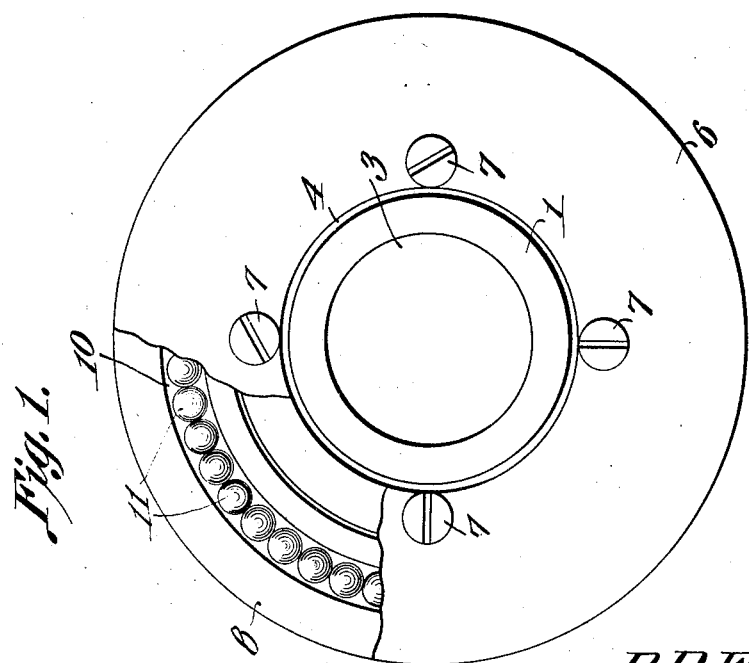
Witnesses
B. B. Farnham,
Inventor
by C. A. Snow & Co.
Attorneys

UNITED STATES PATENT OFFICE.

BION BRADFORD FARNHAM, OF KENMORE, NEW YORK.

BALL-BEARING FLANGED TROLLEY-WHEEL.

1,063,522. Specification of Letters Patent. Patented June 3, 1913.

Application filed January 4, 1913. Serial No. 740,255.

*To all whom it may concern:*

Be it known that I, BION BRADFORD FARNHAM, a citizen of the United States, residing at Kenmore, in the county of Erie and State of New York, have invented a new and useful Ball-Bearing Flanged Trolley-Wheel, of which the following is a specification.

The device forming the subject matter of this application is a wheel adapted to reduce the friction at curves, as the wheel traverses an I beam, track or the like.

The invention aims to provide a wheel of the type described in which a rotatable bearing ring is supported in a novel manner.

It is within the scope of the invention to improve generally and to enhance the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

In the drawings:—Figure 1 shows the invention in front elevation, parts being broken away; and Fig. 2 is a sectional side elevation showing the wheel in position upon an I beam or track.

In carrying out the invention there is provided a wheel 1 having a conical peripheral face 2. The wheel 1 is provided with a central journaling opening 3. In one end of the wheel 1 there is fashioned a peripheral recess 4, communicating with another peripheral recess 5, the diameter of the recess 5 being greater than the diameter of the recess 4. Located in the recess 4 and abutting against the end wall of the recess is an annular flange 6 which projects beyond the periphery of the wheel 1. The flange 6 is held in place by means of screws 7 which enter the wheel 1 between the base of the recess 5 and the opening 3. Journaled for rotation in the recess 5 is a ring 8 which projects beyond the periphery of the wheel 1. The ring 8 upon its exposed face is beveled as indicated 9 so as to engage properly with the supporting I beam or track, as shown in Fig. 1. In the inner faces of the flange 6 and of the ring 8 are formed ball races 10, receiving balls 11.

As will be understood readily, the ring 8 is free to rotate independently of the wheel 1 and of the flange 6, thereby avoiding undue flange friction at curves. The balls 11 serve to support the ring 8 anti-frictionally against movement at right angles to the plane of rotation of the ring.

Having thus described the invention, what is claimed is:—

1. In a device of the class described, a wheel provided with a fixed peripheral flange; a projecting ring rotatable upon the wheel, the ring and the flange being provided with coöperating ball races; and a single set of balls engaged in the ball races.

2. A wheel having in one end, communicating annular recesses of different diameters; a flange located in the larger recess; a ring rotatable in the smaller recess; and a securing element connecting the flange with the wheel, between the base of the larger recess and the base of the smaller recess.

3. In a device of the class described, a wheel having a conical periphery; and a ring journaled for rotation upon the wheel, the ring having a beveled face projecting beyond the conical periphery of the wheel.

In testimony that I claim the foregoing as my own, I have hereto affixed my signature in the presence of two witnesses.

BION BRADFORD FARNHAM.

Witnesses:
 E. L. MCLAREN,
 R. H. TEMPLETON.

Copies of this patent may be obtained for five cents each, by addressing the "Commissioner of Patents, Washington, D. C."